United States Patent
Katto et al.

(10) Patent No.: US 8,717,645 B2
(45) Date of Patent: May 6, 2014

(54) SHEET FEEDING DEVICE

(71) Applicant: Canon Kabushiki Kaisha, Tokyo (JP)

(72) Inventors: Yohei Katto, Nagareyama (JP); Kenji Morita, Toride (JP); Satoshi Seki, Abiko (JP); Akiko Kanno, Kashiwa (JP); Hidenori Sunada, Abiko (JP); Asahiro Nakayoshi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/688,018

(22) Filed: Nov. 28, 2012

(65) Prior Publication Data

US 2013/0135699 A1    May 30, 2013

(30) Foreign Application Priority Data

Nov. 30, 2011   (JP) .................................. 2011-262135

(51) Int. Cl.
*H04N 1/04* (2006.01)

(52) U.S. Cl.
USPC ........... 358/498; 358/497; 358/496; 358/486; 271/10.11

(58) Field of Classification Search
USPC ............... 358/498, 497, 496, 486; 271/10.02, 271/117, 121
See application file for complete search history.

(56) References Cited

U.S. PATENT DOCUMENTS

| | | | |
|---|---|---|---|
| 5,506,658 A * | 4/1996 | Takemura et al. | 399/21 |
| 5,519,482 A * | 5/1996 | Johdai et al. | 399/396 |
| 5,601,281 A | 2/1997 | Kubodera et al. | |
| 6,151,478 A * | 11/2000 | Katsuta et al. | 399/372 |
| 6,298,778 B1 * | 10/2001 | Onodera et al. | 101/232 |
| 6,345,170 B1 * | 2/2002 | Nakazato et al. | 399/388 |
| 7,195,238 B2 * | 3/2007 | Suga et al. | 271/228 |
| 7,422,205 B2 * | 9/2008 | Akiyama et al. | 271/118 |
| 7,924,475 B2 * | 4/2011 | Suzuki | 358/474 |
| 8,235,610 B2 * | 8/2012 | Saito et al. | 400/76 |

* cited by examiner

Primary Examiner — Negussie Worku
(74) Attorney, Agent, or Firm — Canon USA Inc IP Division

(57) ABSTRACT

A sheet feeding device includes a separation roller, a first conveyance roller arranged on a downstream side of the separation roller and conveys the sheet separated by the separation roller, a second conveyance roller further conveys the sheet conveyed by the first conveyance roller, wherein the separation roller and the first conveyance roller are driven exclusively of each other by a first motor, and a control unit controls such that, when a trailing edge of a sheet passes through the separation roller while the sheet is being conveyed by the first conveyance roller and the second conveyance roller, the first motor makes a conveyance speed of the first conveyance roller higher than the conveyance speed thereof before the trailing edge of the sheet passes through the separation roller, and that, when the trailing edge of the sheet passes through the first conveyance roller, the first motor drives the separation roller.

9 Claims, 10 Drawing Sheets

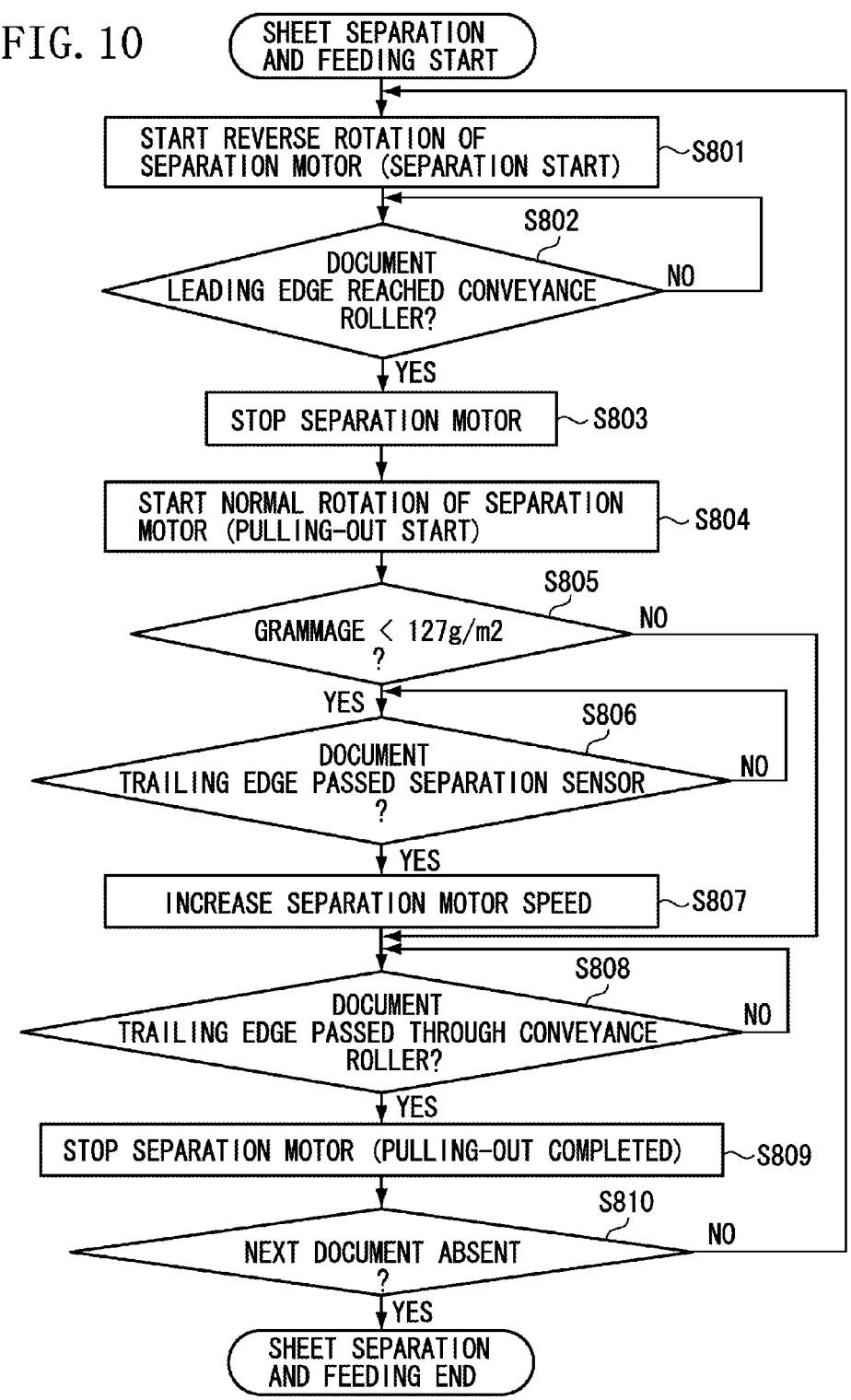

SHEET FEEDING DEVICE

BACKGROUND OF THE INVENTION

1. Field of the Invention

The present invention relates to separation of sheets in a sheet feeding device.

2. Description of the Related Art

A general image reading apparatus reads the image of a document placed on a document platen by using an optical unit provided under the document platen. Alternatively, a general image reading apparatus reads the image of a document conveyed from a document tray by an automatic document feeder (ADF) provided in the image reading apparatus.

In a document separation and feeding mechanism of an ADF, it is a common configuration to control a separation roller and a feeding roller by respective independent motors, or to control them by a single motor with a clutch connected. However, use of many motors and clutches results in an increase in apparatus size and in cost, so that various devices have been made in this connection.

For example, in U.S. Pat. No. 5,601,281, a document feeding device has a motor configured to make normal and reverse rotation, a first drive shaft configured to be driven at the time of normal rotation, and a second drive shaft configured to be driven at the time of reverse rotation. A separation roller is connected to the first drive shaft, and a registration roller (a feeding roller) is connected to the second drive shaft. The document feeding device performs separation and feeding conveyance by normal and reverse rotation of the motor. This helps to achieve a reduction in apparatus size and in cost.

In a separation/feeding mechanism in which switching between separation and feeding (pulling-out) is effected by a change in the rotational direction of a single motor, it is impossible to change the rotational direction of the motor until the trailing edge of a document passes through the feeding roller. Thus, it is impossible to separate the next document until the trailing edge of the document passes through the feeding roller and the motor stops, thus resulting in a rather long document feeding interval. As a result, the productivity in document reading is reduced.

SUMMARY OF THE INVENTION

The present disclosure is directed to a document feeding device capable of preventing or mitigating a reduction in productivity in document reading. Further, the present disclosure is directed to a document feeding device configured to selectively perform separation and conveyance of documents by switching the rotational direction of a motor, wherein the document feeding device can shorten an separation interval of a plurality of documents.

According to an aspect disclosed herein, a sheet feeding device includes a feeding tray configured to stack thereon a plurality of sheets to be fed, a separation roller configured to separate, one by one, the plurality of sheets stacked on the feeding tray, a first conveyance roller arranged on a downstream side of the separation roller in a sheet conveyance direction and configured to convey the sheet separated by the separation roller, a first motor configured to drive the separation roller and the first conveyance roller exclusively of each other, a second conveyance roller configured to be driven by a second motor different from the first motor, arranged on the downstream side of the first conveyance roller, and configured to further convey the sheet conveyed by the first conveyance roller, and a control unit configured to control the first motor such that, when a trailing edge of the sheet passes through the separation roller while the sheet is being conveyed by the first conveyance roller and the second conveyance roller, the first motor makes a conveyance speed of the first conveyance roller higher than the conveyance speed thereof before the trailing edge of the sheet passes through the separation roller, and that, when the trailing edge of the sheet passes through the first conveyance roller, the first motor drives the separation roller.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles disclosed herein.

FIG. 10 is a flowchart illustrating a separation and feeding control operation according to a second exemplary embodiment of the present invention taking a document grammage into account.

DESCRIPTION OF THE EMBODIMENTS

Various exemplary embodiments, features, and aspects of the invention will be described in detail below with reference to the drawings.

Figure 1:
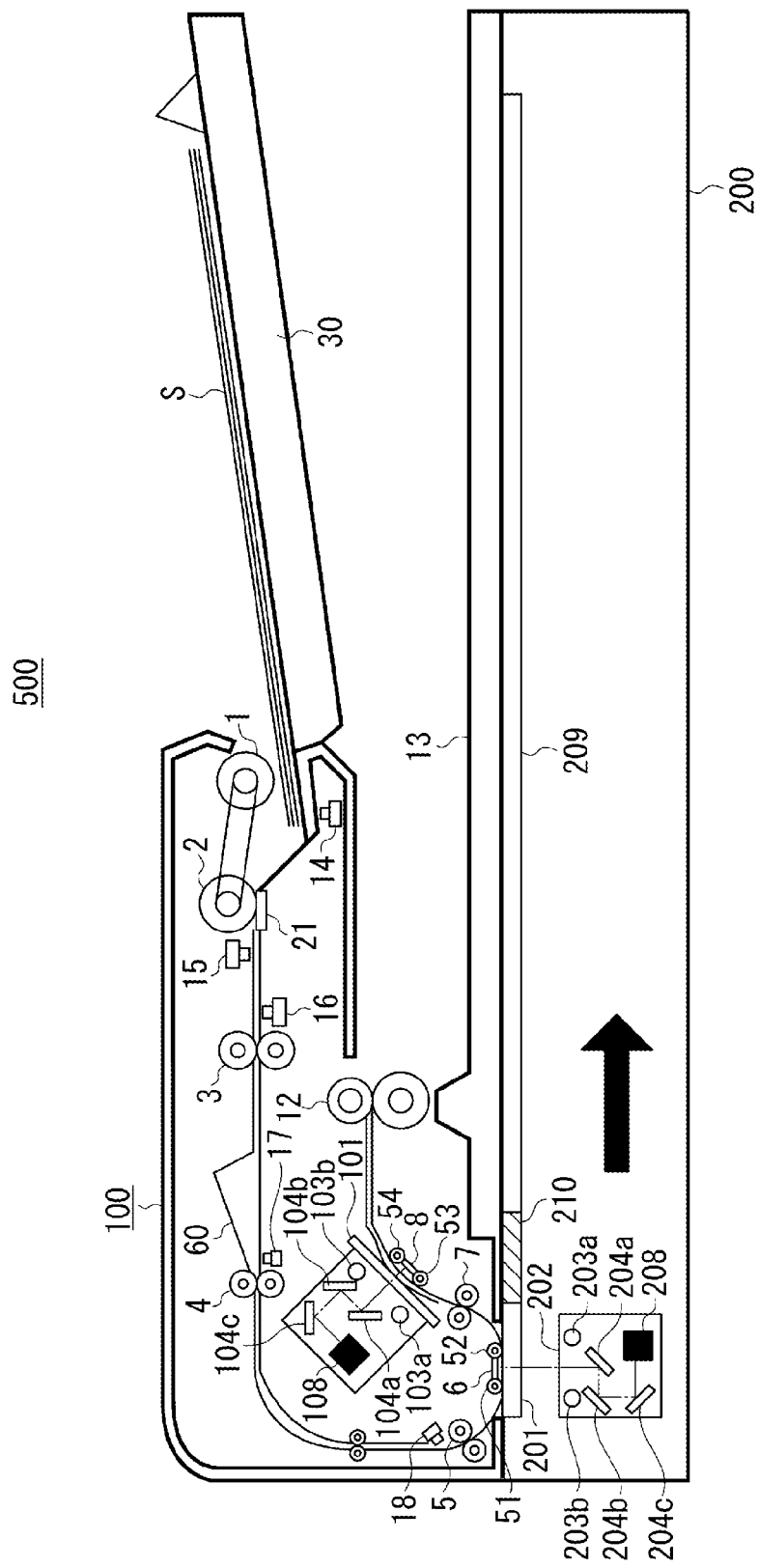
FIG. 1 is a sectional view of an image reading apparatus including an ADF according to a first exemplary embodiment.

In the following, a first exemplary embodiment of the present disclosure will be described. FIG. 1 is a sectional view illustrating a construction of an image reading apparatus including a document feeding unit (hereinafter referred to as an ADF) according to the first exemplary embodiment. An image reading apparatus 500 includes an image reading unit 200, an automatic document feeding unit 100, and a controller unit (not illustrated in FIG. 1).

An operation of the ADF 100 will be described with reference to FIG. 1. A document bundle S, which includes one or more document sheets, is stacked on a document tray 30 as a feeding tray. A pickup roller 1 falls onto the surface of the document bundle S stacked on the document tray 30 and rotates. As a result, the uppermost document of the document bundle S is fed. The document fed by the pickup roller 1 is separated into a single sheet by the action of a separation roller 2 and a separation pad 21. This separation is realized by a well-known pad separation technique.

The document separated by the separation roller 2 and the separation pad 21 is conveyed by a conveyance roller pair 3, and contacts a registration roller pair 4. As described below, the separation roller 2 and the conveyance roller 3 are driven and rotated by a common motor exclusively (i.e. independently) of each other according to the rotational direction thereof. A space 60 is provided on the upstream side of the registration roller pair 4, and the space 60 accommodates a bend generated on the leading edge side of the document contacting the registration roller pair 4. Due to the generation of a bend in the document, skew of the document is eliminated. The registration roller pair 4 is driven by a motor different from the motor by which the separation roller 2 and the conveyance roller 3 are driven. At the position of the registration roller pair 4, the conveyance of the leading edge of the document is temporarily stopped. After that, the registration roller pair 4 is driven at predetermined timing, and the document is conveyed again. Arranged on the downstream side of the registration roller pair 4 is a conveyance path (a feeding path) for conveying the document passing the registration roller pair 4 to a reading glass 201.

The document sent to the feeding path is conveyed to an obverse side reading position by a conveyance roller pair 5, a conveyance roller 51, and a conveyance roller 52. The obverse side of the document passing between the reading glass 201 and a glass opposing member 6 is irradiated with obverse side light-emitting diodes (LEDs) 203a and 203b. The reflection light from the surface effects image formation on a surface line sensor 208, whereby the image on the document surface is read. The document conveyed by the conveyance roller 52 is conveyed to a reverse side reading position by a conveyance roller pair 7, a conveyance roller 53, and a conveyance roller 54. The reverse side of the document passing between a reverse side reading glass 101 and a glass opposing member 8 is irradiated with reverse side LEDs 103a and 103b. The reflection light from the surface effects image formation on a reverse side line sensor 108, whereby the image on the reverse side of the document is read. The document conveyed by the conveyance roller 54 is conveyed to a discharge tray 13 by a discharge roller pair 12 while passing through a discharge sensor 11.

Provided on the document tray 30 is a guide regulation plate (not illustrated) slidable in a width direction orthogonal to the direction in which the stacked document bundle S is conveyed. Further, there is provided a document width detection sensor (not illustrated) configured to detect the document width in conjunction with the guide regulation plate. The width of the document is detected by the document width detection sensor. Further, the document conveyance rearward length is detected based on the document passage time and the document conveyance speed at a separation sensor 15 and a read sensor 18. Then, the document size is determined from a combination of these. The separation sensor 15 is provided between the separation roller 2 and the conveyance roller pair 3, and the read sensor 18 is provided in front of the conveyance roller pair 5.

The document tray 30 is provided with a document presence sensor 14, making it possible to determine the presence of a document on the document tray 30.

Figure 2:
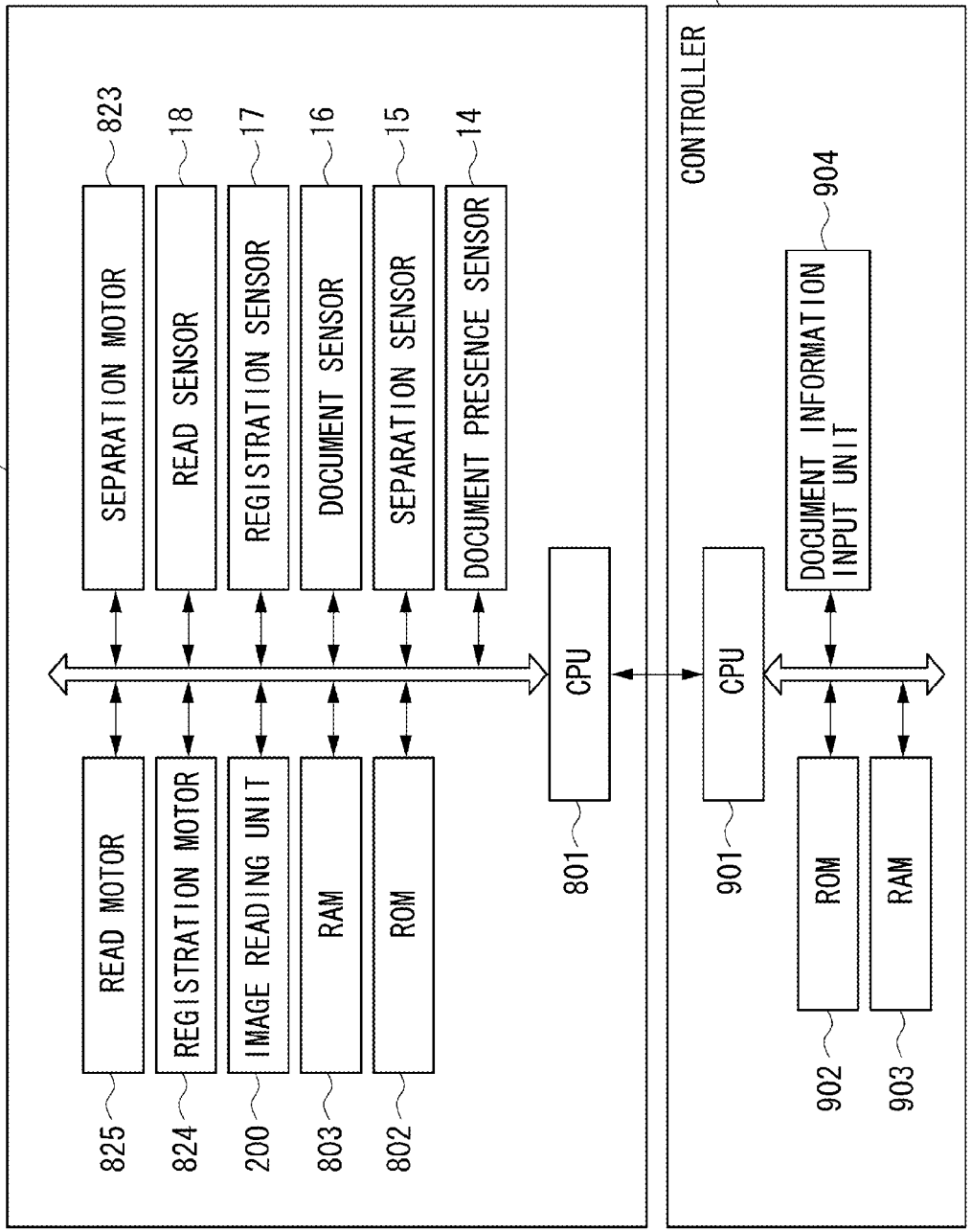
FIG. 2 is a control block diagram illustrating an image reading apparatus including the ADF according to the first exemplary embodiment.

FIG. 2 is a control block diagram of an image reading apparatus including an ADF according to the present exemplary embodiment. The image reading unit 200 and the ADF 100 include a control unit (hereinafter referred to as a central processing unit (CPU)) 801, a read-only memory (ROM) 802, and a random access memory (RAM) 803. The ROM 802 stores a control program, and the RAM 803 stores input data and operation data. The reading unit 200 includes the obverse side LEDs 203a and 203b, the obverse side line sensor 208, the reverse side LEDs 103a and 103b, the reverse side line sensor 108, etc., and reads documents. A separation motor 823 raises and lowers the pickup roller 1, and rotates the pickup roller 1, the separation roller 2, and the conveyance roller pair 3. A registration motor 824 rotates the registration roller pair 4. A read motor 825 rotates the conveyance roller pair 5, the conveyance roller 51, the conveyance roller 52, the conveyance roller pair 7, the conveyance roller 53, the conveyance roller 54, and the discharge roller pair 12. The separation sensor 15 detects an edge portion of a document conveyed by the separation roller 2. The document presence detection sensor 14 detects the presence of a document on the document tray 30. A registration sensor 17 detects a document conveyed by the registration roller pair 4.

A controller 300 includes a CPU 901, a ROM 902, and a RAM 903. The ROM 902 stores a control program, and the RAM 903 stores input data and operation data. The CPU 901 exchanges data related to image reading control with the CPU 801 via a serial communication line. Further, a document information input unit 904 is provided. The CPU 901 notifies the CPU 801 of document information input at the document information input unit 904.

Figure 3A:
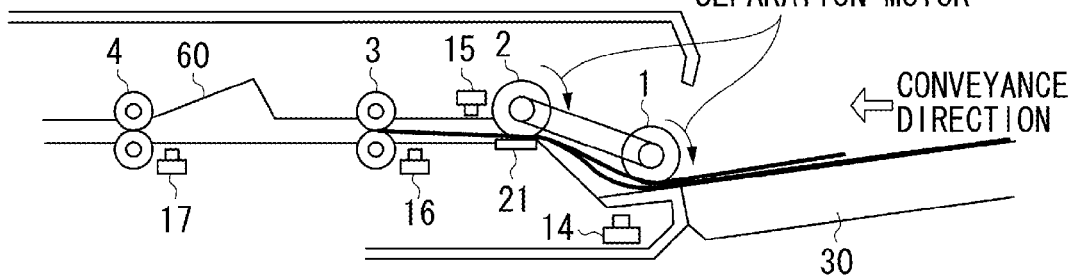
FIGS. 3A, 3B and 3C are diagrams illustrating a separation and feeding control operation.
Figure 3B:
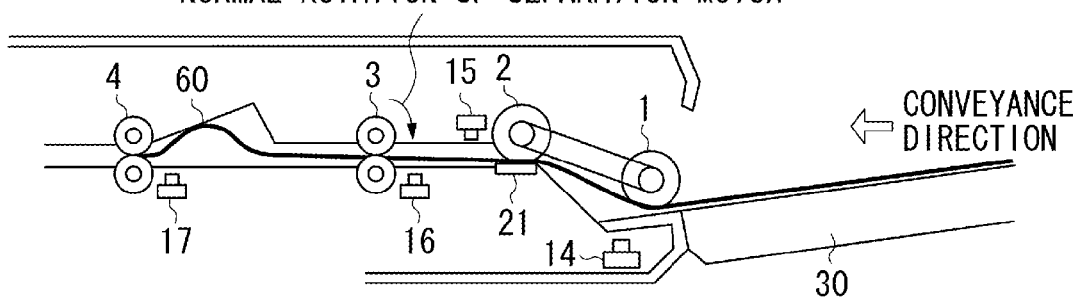
Figure 3C:
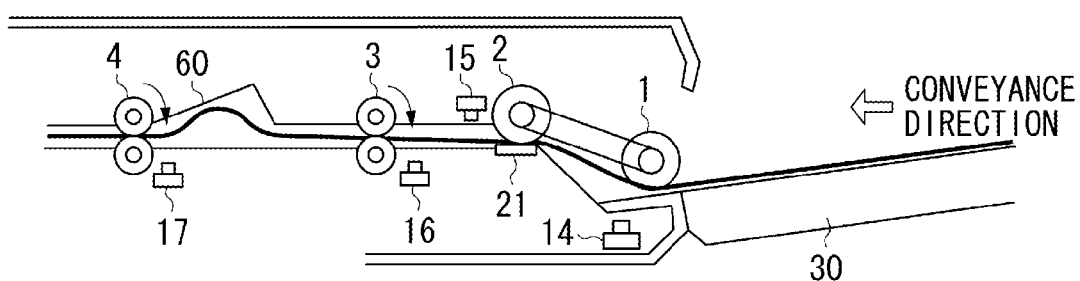

FIGS. 3A, 3B, and 3C are diagrams illustrating a separation and feeding control operation. First, as illustrated in FIG. 3A, in order to separate the uppermost document of the document bundle S stacked on the document tray 30, the separation motor 823 rotates in a first direction (a reverse rotational direction). When the separation motor 823 makes reverse rotation, the pickup roller 1 and the separation roller 2 connected each other via a gear (not illustrated) are rotated in a conveyance direction. At this time, the conveyance roller pair 3 is also connected to the separation motor 823 via a gear (not illustrated). However, it does not rotate due to a gear construction in which no drive is transmitted at the time of reverse rotation of the separation motor 823. By the rotation of the pickup roller 1 and the separation roller 2, the document is drawn in toward the downstream side in the conveyance direction. Depending on the condition of the documents etc., a plurality of documents are drawn in, but solely the uppermost document is separated by the separation roller 2 and the separation pad 21.

The separated document reaches the conveyance roller pair 3 by the conveyance by the pickup roller 1 and the separation roller 2. At the point in time when the document reaches the conveyance roller pair 3, the separation motor 823 stops, and the rotation of the pickup roller 1 and the separation roller 2 stops. Whether the leading edge of the document has reached the conveyance roller pair 3 is determined by passage of a predetermined period of time after the detection of the leading edge of the document by the separation sensor 15.

Next, as illustrated in FIG. 3B, the separation motor 823 rotates in a second direction (a normal rotational direction) which is reverse to the first direction. Then, the conveyance roller pair 3 rotates in the conveyance direction, and the document, which has reached the conveyance roller pair 3, is further conveyed. At this time, due to the gear construction in which no drive is transmitted at the time of normal rotation of the separation motor 823 thereto, the pickup roller 1 and the separation roller 2 are not rotated by the driving of the separation motor 823. However, due to the conveyance of the document by the conveyance roller pair 3, the pickup roller 1 and the separation roller 2 rotate in the conveyance direction.

The leading edge of the document conveyed by the conveyance roller pair 3 reaches the registration roller pair 4, which is not rotating. Also after the reaching, the conveyance roller pair 3 feeds the document toward the downstream side for a predetermined time period, whereby a bend is generated in the document within the space 60. Then, at the timing at which the leading edge side of the document is bent by a predetermined amount, the registration motor 824 is driven as illustrated in FIG. 3C. Then, the registration roller pair 4 rotates in the conveyance direction, and the document is further conveyed downstream. At this time, the document is conveyed by the rotation of the registration roller pair 4 and the conveyance roller pair 3.

Figure 4A:
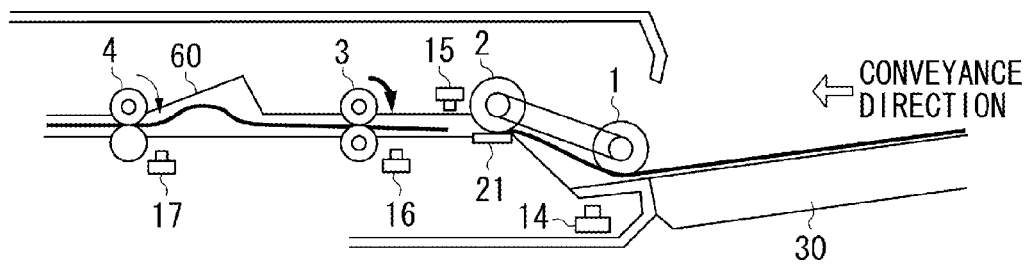
FIGS. 4A, 4B, and 4C are diagrams illustrating an operation when the trailing edge of a document is pulled out by a feeding roller.
Figure 4B:
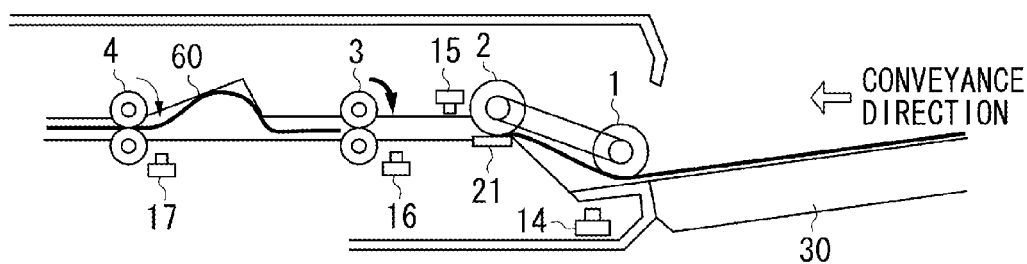
Figure 4C:
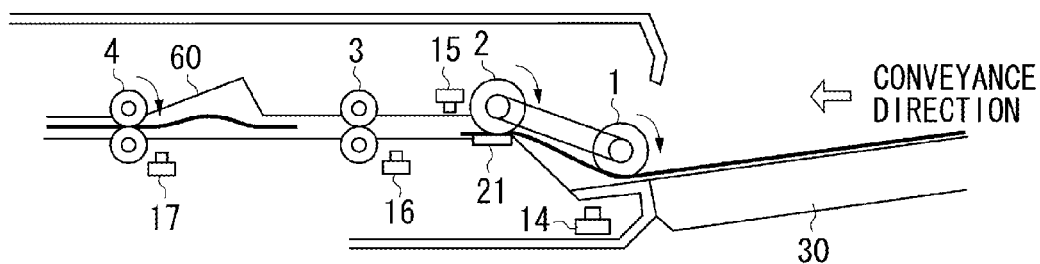

FIGS. 4A, 4B, and 4C are diagrams illustrating an operation of pulling out the trailing edge of the document from between the separation roller 2 and the separation pad 21 by the conveyance roller pair 3. As illustrated in FIG. 4A, when the trailing edge of the document passes through the separation sensor 15 while the document is being conveyed by the registration roller pair 4 and the conveyance roller pair 3, the separation motor 823 is accelerated such that the conveyance speed of the conveyance roller 3 is increased up to a predetermined speed. At this time, the predetermined speed satisfies the relationship: the conveyance speed of the registration roller pair 4<the speed of the conveyance roller pair 3. Due to the acceleration of the separation motor 823, it is possible for the trailing edge of the document to pass through the conveyance roller pair 3 earlier. The conveyance speed is increased at this timing because at this point in time, the length of the document in the conveyance direction is determined for the first time. If the separation motor 823 is accelerated before the trailing edge of the document passed through the separation roller 2, the timing at which the trailing edge of the document passes through the separation roller 2 will be unknown, so that the bend of the document may not be accommodated in the loop space 60.

Due to the acceleration of the separation motor 823, the document is conveyed so as to be pushed in from backward. However, the trailing edge of the document has passed the separation roller 2, and the bend of the document is accommodated in the loop space 60 as illustrated in FIG. 4B, so that no wrinkles or the like are generated in the document. The above-mentioned predetermined speed is calculated such that the bend can be accommodated in the loop space 60.

When the trailing edge of the document passes through the conveyance roller pair 3, the separation motor 823 stops, and, as illustrated in FIG. 4C, the separation motor 823 starts reverse rotation to feed the next document. Whether the trailing edge of the document has passed through the conveyance roller pair 3 is determined by elapse of a predetermined period of time after the detection of the trailing edge of the document by the document sensor 16. The document sensor 16 is arranged between the separation roller 2 and the conveyance roller pair 3 and on the downstream side of the separation sensor 15.

Figure 5:
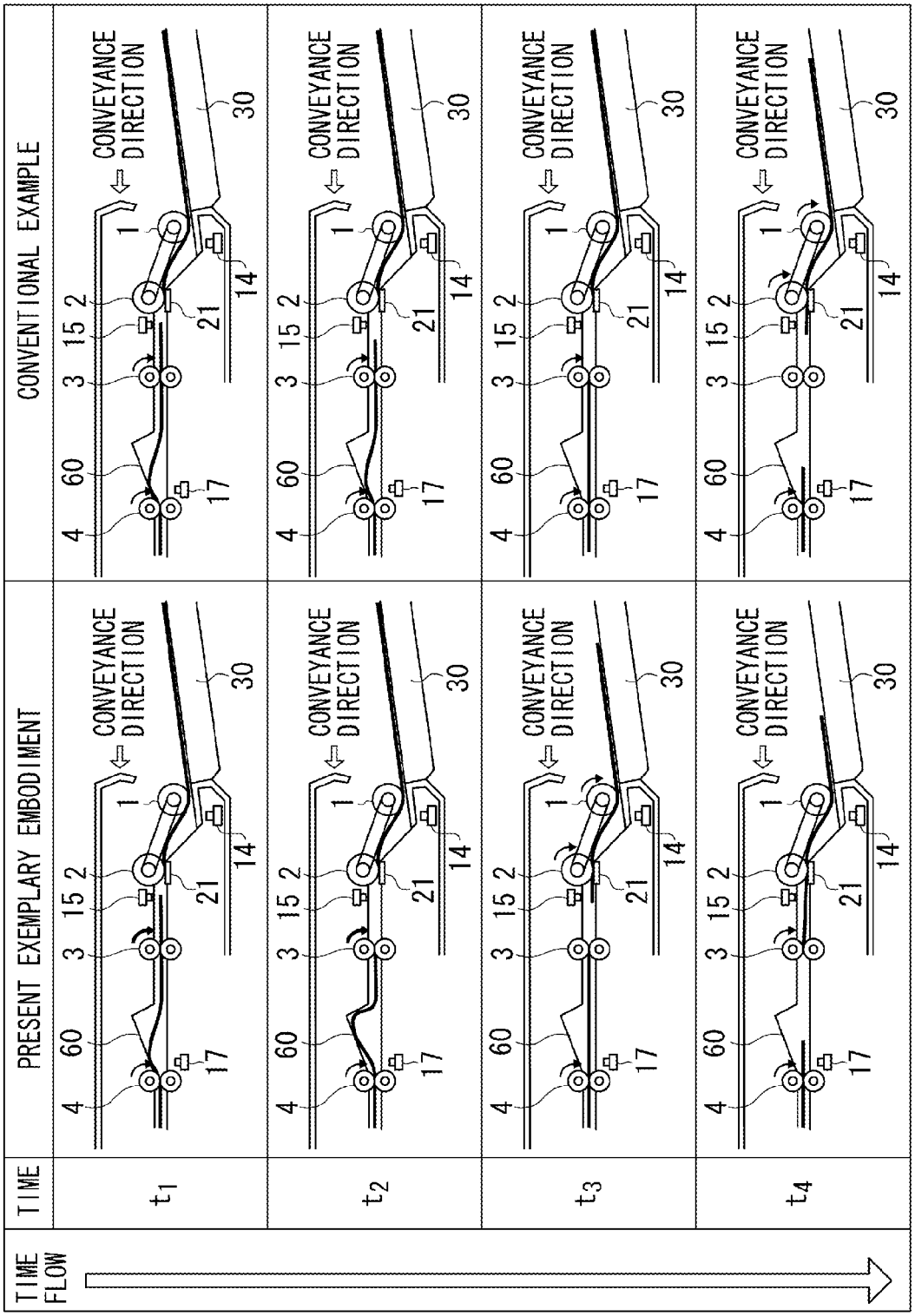
FIG. 5 is a diagram illustrating a document position.
Figure 6:
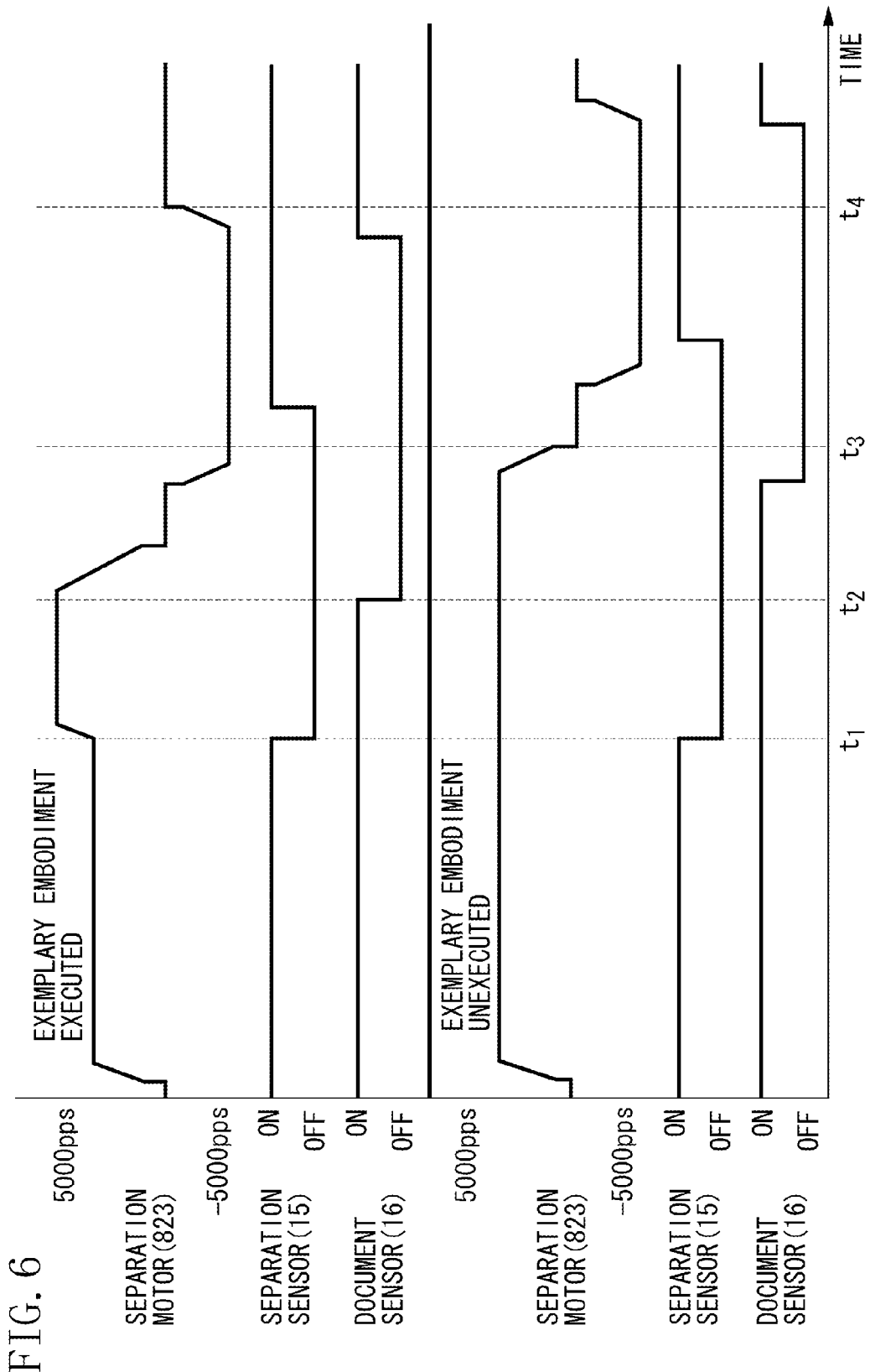
FIG. 6 is a time chart illustrating signals of portions of the ADF according to the first exemplary embodiment of the present invention.

FIG. 5 is a diagram illustrating a comparison in the position of the fed document between the case where the control according to the present exemplary embodiment is executed and the case where no such control is executed (conventional example). FIG. 6 is a timing chart illustrating a drive signal of the separation motor 823 and outputs of the separation sensor 15 and the document sensor 16.

The trailing edge of the document passes the separation sensor 15 at the timing as indicated by time t1. At time t1, in the conventional example, the speed of the separation motor is not changed, whereas, in the present exemplary embodiment, the separation motor 823 is accelerated. Due to the acceleration of the separation motor 823, the trailing edge of the document passes through the document sensor 16 at time t2 earlier than in the conventional example. The trailing edge of the document passes through the conveyance roller pair 3 after a predetermined period of time elapses from time t3. In the conventional example, the trailing edge of the document passes through the document sensor 16 between time t2 and time t3, and the trailing edge of the document passes through the conveyance roller pair 3 at time t3. In the present exemplary embodiment, the separation of the next document has already been started at time t3. In the present exemplary embodiment, the leading edge of the next document reaches the document sensor 16 at time t4. In the conventional example, the next document has not reached the document sensor 16 yet at time t4. In this way, in the configuration according to the present exemplary embodiment, it is possible to reduce the sheet feeding interval, thus making it possible to improve productivity in document reading.

Figure 7:
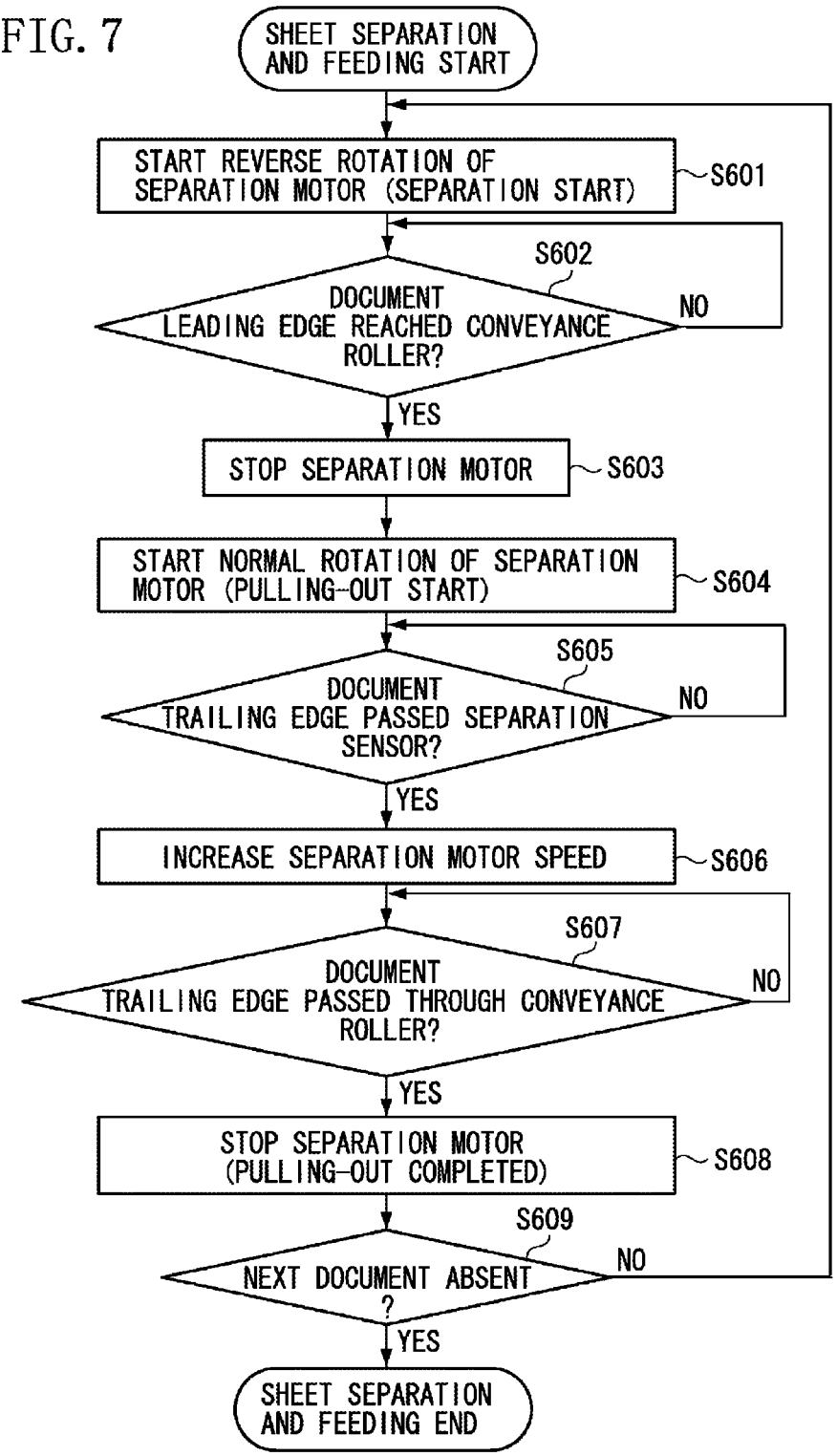
FIG. 7 is a flowchart illustrating a separation and feeding control operation according to the first exemplary embodiment of the present invention.

FIG. 7 is a flowchart illustrating document separation and feeding control according to the first exemplary embodiment. The control of this flowchart is executed by the CPU 801 according to a program stored in the ROM 802.

When a sheet conveyance command is issued by the CPU 901, the control of this flowchart is executed. In step S601, the CPU 801 drives the separation motor 823 in reverse rotation to rotate the pickup roller 1 and the separation roller 2 in the conveyance direction, whereby the document stacked on the document tray 30 is separated. Next, in step S602, the CPU 801 determines whether the leading edge of the document has reached the conveyance roller pair 3. The determination is made based on elapse of a predetermined period of time after the leading edge of the document has passed the document sensor 16. Next, in step S603, when the leading edge of the document reaches the conveyance roller pair 3, the CPU 801 stops the separation motor 823. Next, in step S604, the CPU 801 causes the separation motor 823 to make normal rotation to rotate the conveyance roller pair 3 in the conveyance direction, whereby the pulling-out of the separated document is started. Next, in step S605, the CPU 801 determines whether the trailing edge of the document has passed the separation sensor 15. Next, in step S606, when the trailing edge of the document passes the separation sensor 15, the CPU 801 accelerates the separation motor 823 up to a predetermined speed. Next, in step S607, the CPU 801 determines whether the trailing edge of the document has passed through the conveyance roller pair 3. This determination is made based on the elapse of a predetermined period of time after the leading edge of the document has passed the document sensor 16. In step S608, when the predetermined period of time has elapsed, which means the trailing edge of the document has passed the separation sensor 15, the CPU 801 stops the separation motor 823. Next, in step S609, the CPU 801 determines whether a next document exists on the document tray 30 by the document presence detection sensor 14. When there is a next document, the CPU 801 repeats the processing of steps S601 through S608 until there is no document on the tray 30.

Figure 8:
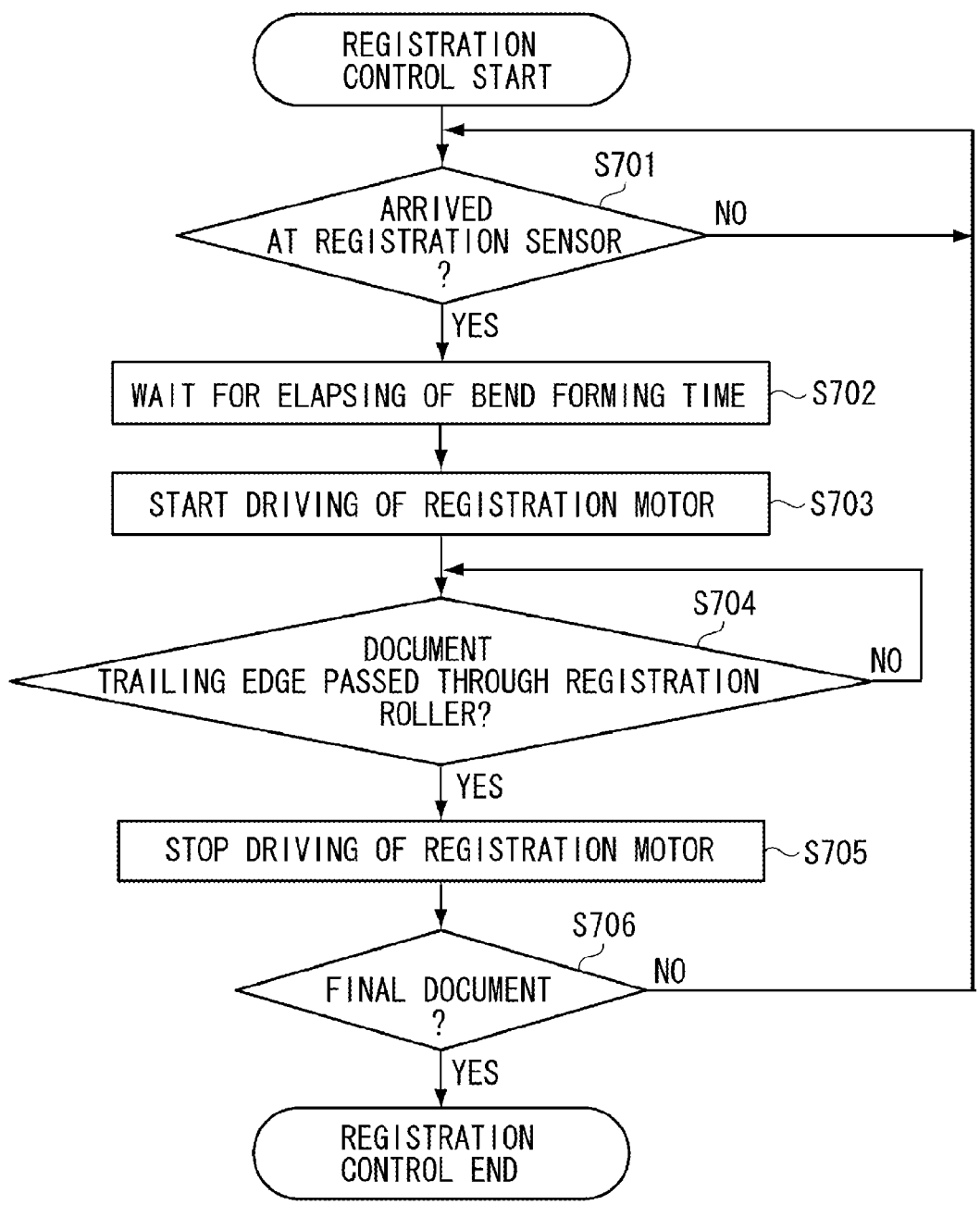
FIG. 8 is a flowchart illustrating document registration control.

FIG. 8 is a flowchart illustrating document registration control. The control of this flowchart is executed by the CPU 801 according to a program stored in the ROM 802.

When a sheet conveyance command is issued by the CPU 901, the control of this flowchart is executed. This control is executed on a timesharing basis with the sheet separation and feeding control of the flowchart of FIG. 7.

First, in step 701, the CPU 801 determines whether a document has reached the registration sensor 17. In step S702, when the document reaches the registration sensor 17, the CPU 801 waits for the elapse of a bend formation time for forming a predetermined amount of bend in the document. At this time, the registration roller pair 4 is stopped. The bend formation time varies depending on the document conveyance speed when the document reaches the registration sensor 17. When, in step S703, the bend formation time elapses, the CPU 801 drives the registration motor 824 to rotate the registration roller pair 4 to resume the conveyance of the document. Next, in step S704, the CPU 801 determines whether the trailing edge of the document has passed through the registration roller pair 4. When, in step S705, the trailing edge passes through the registration roller pair 4, the CPU 801 stops the driving of the registration motor 824. The determination as to whether the document has passed through the registration roller pair 4 is made based on the elapse of a predetermined period of time after the leading edge of the document has passed the registration sensor 17. Next, in step S706, the CPU 801 determines whether the document being conveyed is the final document. When it is not the final document, the CPU 801 waits for the next document to arrive at the registration sensor 17.

As a result, even in a document conveyance device which performs the separation and feeding of a document by a change in the rotational direction of a motor, it is possible to shorten the time period until the trailing edge of the document passes through the conveyance roller 3, and to expedite the start of the separation of the next document, so that it is possible to mitigate a reduction in productivity.

Figure 9:
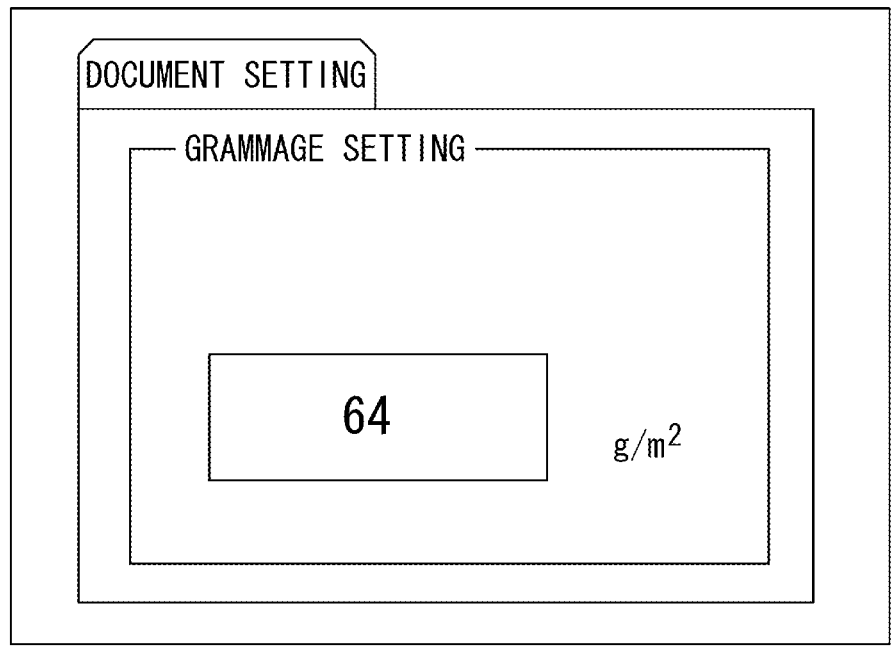
FIG. 9 is a diagram illustrating a document information input screen.

In the following, a second exemplary embodiment will be described. When the grammage of a document is relatively large as in the case of a cardboard (heavy paper), an accelerated conveyance of the document by the conveyance roller 3 after the document has passed the separation sensor 15, may result in the document generating a frictional sound in the loop space 60. In view of this, in the second exemplary embodiment, information on the grammage of the document is acquired, and separation control according to the grammage is performed. FIG. 9 is a diagram illustrating a document grammage setting screen of the document information input unit 904. This screen enables the user to set the grammage of the document. The grammage thus set is reflected in the control as illustrated in FIG. 10.

FIG. 10 is a flowchart illustrating sheet separation and feeding control according the second exemplary embodiment. The control of this flowchart is executed by the CPU 801 according a program stored in the ROM 802. When a sheet conveyance command is issued by the CPU 901, the control of this flowchart is executed.

The processing of steps S801 through S804 is similar to that of steps S601 through S604 of FIG. 7, so that a description thereof is not repeated. In step S805, the CPU 801 determines whether the document grammage input at the document information input unit 904 is smaller than a predetermined value (e.g., 127 g/m$^2$). When the grammage is smaller than the predetermined value, the CPU 801 determines, in step S806, whether the trailing edge of the document has passed the separation sensor 15. The processing of steps S807 through S810 to be executed from this onward is similar to that of steps S606 through S609, so that a description thereof is not repeated. In step S805, when the grammage is equal to or larger than the predetermined value, the CPU 801 skips the processing of steps S806 and S807, and executes the processing of step S808. In other words, when the grammage is equal to or larger than the predetermined value, the CPU 801 does not accelerate the separation motor 823, thereby preventing the generation of a document frictional sound in the loop space 60. On the other hand, when the grammage is smaller than the predetermined value, the CPU 801 performs acceleration control on the separation motor 823 as in the first exemplary embodiment. The value of the grammage for comparison is not restricted to the above-mentioned one but may be set appropriately according to a configuration of the conveyance route and a conveyance speed.

As a result, even in a document feeding device which separates and feeds a document by a change in the rotational direction of a motor, when the grammage of the document is smaller than a predetermined value, it is possible to shorten the time elapsing until the trailing edge of the document passes through the conveyance roller 3. Since the separation start timing for the next document can be moved up, it is possible to mitigate a reduction in productivity. Further, when the grammage is equal to or larger than the predetermined value, it is possible to avoid the generation of a document frictional sound, which is likely to be generated when the document is bent by the acceleration of the separation motor 823.

Although in the above-described exemplary embodiments the sheet feeding device is described as a document feeding device, this should not be construed restrictively. The above-described control is also applicable to feeding of a recording sheet in an image forming apparatus and feeding of an insert sheet in an inserter.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-262135 filed Nov. 30, 2011, which is hereby incorporated by reference herein in its entirety.

What is claimed is:

1. A sheet feeding device comprising:
  a feeding tray configured to stack thereon a plurality of sheets to be fed;
  a separation roller configured to separate the plurality of sheets stacked on the feeding tray one by one;
  a first conveyance roller arranged on a downstream side of the separation roller in a sheet conveyance direction and configured to convey a sheet separated by the separation roller;
  a first motor configured to drive the separation roller and the first conveyance roller independently of each other;
  a second conveyance roller configured to be driven by a second motor different from the first motor, arranged on the downstream side of the first conveyance roller, and configured to further convey the sheet conveyed by the first conveyance roller; and
  a control unit configured to control the first motor such that, when a trailing edge of the sheet passes through the separation roller while the sheet is being conveyed by the first conveyance roller and the second conveyance roller, the first motor makes a conveyance speed of the first conveyance roller greater than the conveyance speed thereof before the trailing edge of the sheet passes through the separation roller, and when the trailing edge of the sheet passes through the first conveyance roller, the first motor drives the separation roller.

2. The sheet feeding device according to claim 1, wherein the control unit increases the conveyance speed of the first conveyance roller without changing the conveyance speed of the second conveyance roller.

3. The sheet feeding device according to claim 1, further comprising a sensor arranged between the separation roller and the first conveyance roller and configured to detect the sheet,
   wherein the control unit increases the conveyance speed of the first conveyance roller when the sensor detects the trailing edge of the sheet.

4. The sheet feeding device according to claim 1, further comprising a conveyance path between the first conveyance roller and the second conveyance roller,
   wherein the conveyance path includes a space configured to accommodate a bend formed in the sheet by an increase in the conveyance speed of the first conveyance roller.

5. The sheet feeding device according to claim 1, further comprising an acquisition unit configured to acquire a grammage of the sheet,
   wherein, if the grammage of the sheet is equal to or greater than a predetermined value, the control unit does not execute the increase in the conveyance speed of the first conveyance roller when the trailing edge of the sheet passes through the separation roller.

6. The sheet feeding device according to claim 5, wherein the acquisition unit includes a setting unit configured to allow manual setting the grammage of the sheet.

7. The sheet feeding device according to claim 1, wherein the control unit rotates the separation roller by rotating the first motor in a first direction, and rotates the first conveyance roller by rotating the first motor in a second direction reverse to the first direction.

8. The sheet feeding device according to claim 1, further comprising a reading unit configured to read an image of the sheet conveyed by the second conveyance roller.

9. A document reading apparatus comprising:
   a feeding tray configured to stack thereon a plurality of documents to be fed;
   a separation roller configured to separate the plurality of documents stacked on the feeding tray one by one;
   a first conveyance roller arranged on a downstream side of the separation roller in a document conveyance direction and configured to convey the document separated by the separation roller;
   a first motor configured to drive the separation roller and the first conveyance roller independently of each other;
   a second conveyance roller configured to be driven by a second motor different from the first motor, arranged on the downstream side of the first conveyance roller, and configured to further convey the document conveyed by the first conveyance roller;
   a control unit configured to control the first motor such that, when a trailing edge of the document passes through the separation roller while the document is being conveyed by the first conveyance roller and the second conveyance roller, the first motor makes a conveyance speed of the first conveyance roller greater than the conveyance speed thereof before the trailing edge of the document passes through the separation roller, and that, when the trailing edge of the document passes through the first conveyance roller, the first motor drives the separation roller; and
   a reading unit configured to read an image of the document conveyed by the second conveyance roller.

* * * * *